United States Patent [19]

Little et al.

[11] Patent Number: 4,534,954
[45] Date of Patent: Aug. 13, 1985

[54] SODIUM HYDROSULFITE SLURRIES

[75] Inventors: Edwin D. Little; Karsten R. Minzghor, both of Portsmouth, Va.

[73] Assignee: Virginia Chemicals Inc., Portsmouth, Va.

[21] Appl. No.: 585,640

[22] Filed: Mar. 8, 1984

Related U.S. Application Data

[63] Continuation of Ser. No. 408,786, Aug. 17, 1982, abandoned.

[51] Int. Cl.$^3$ .............................. C01B 17/66; D06L 3/10
[52] U.S. Cl. .................................... 423/515; 423/265; 252/188.23; 8/110
[58] Field of Search ................ 423/515, 516, 265; 252/188.23; 8/110

[56] References Cited

U.S. PATENT DOCUMENTS

| | | | |
|---|---|---|---|
| 3,839,217 | 10/1974 | Owen et al. | 423/515 |
| 3,939,210 | 10/1974 | Owen et al. | 423/515 |
| 3,960,649 | 6/1976 | Sullivan | 423/515 |
| 3,985,674 | 10/1976 | Ellis et al. | 423/515 |
| 4,218,327 | 8/1980 | Wellington | 166/246 |
| 4,283,303 | 8/1981 | Ellis | 423/515 |
| 4,357,256 | 11/1982 | Yamasuchi | 423/515 |

FOREIGN PATENT DOCUMENTS 2031820 2/1971 Fed. Rep. of Germany ...... 423/515

*Primary Examiner*—Gary P. Straub
*Attorney, Agent, or Firm*—Depaoli & O'Brien

[57] ABSTRACT

Aqueous sodium dithionite slurries, which are non-settling during shipment thereof and are thereafter pumpable, and a method for their manufacture are provided. The slurries contain at least 25% by weight of crystalline pure sodium dithionite and at least about 0.13% by weight of a xanthan gum. As textile bleaching compositions, the slurries comprise, on a weight basis, at least about 36% of commercial sodium dithionite, at least about 3% of sodium hydroxide, at least about 0.25% of a chelate, and at least about 0.25% of a xanthan gum. As woodpulp bleaching compositions, the slurries comprise, on a weight basis, about 28% of commercial sodium dithionite, at least about 2% of sodium carbonate, at least about 2% of sodium tripolyphosphate, and at least about 0.13% of a xanthan gum.

2 Claims, No Drawings

SODIUM HYDROSULFITE SLURRIES

This application is a continuation of application Ser. No. 408,786, filed Aug. 17, 1982, now abandoned.

BACKGROUND OF THE INVENTION

1. Field of the Invention

This invention relates to aqueous slurries and particularly relates to non-settling and flowable aqueous slurries of sodium dithionite that remain in pumpable form without significant expansion, settling, or gellation.

2. Review of the Prior Art

Sodium dithionite, commonly termed sodium hydrosulfite, and, less correctly, sodium hyposulfite, is a powerful reducing agent that has long been used for bleaching, particularly for bleaching textiles and wood pulps such as ground wood and semi-chemical pulps.

Sodium dithionite has usually been manufactured by significantly different processes that are alternatively based on zinc dust, sodium formate, sodium borohydride, or sodium bisulfite (electrolytic). Such processes are disclosed, for example, in U.S. Pat. Nos. 2,938,771, 3,004,825, 3,259,457, 3,411,875, 3,718,732, 3,872,221, 3,887,695, 3,897,544, 3,927,190, and 4,127,642.

The products of these processes are herein respectively identified as zinc-derived, formate-derived, borohydride-derived, and electrolytically-derived sodium dithionite. Because the zinc process produces zinc dithionite which is no longer ecologically acceptable, zinc dithionite is converted to sodium dithionite by adding sodium hydroxide or sodium carbonate, whereby zinc hydroxide or zinc carbonate is precipitated and removed by filtering.

Sodium dithionite from any of these four processes is potentially available on a commercial basis in the form of crystalline powders, solutions, or slurries. When sodium dithionite is prepared under conditions which are controlled so as to grow elongated crystals of a size which can be readily separated from the mother liquor by sedimentation or filtration, suitable crystals have a length of at least 320 microns and a thickness of at least 120 microns. If allowed to settle as an aqueous sodium dithionite slurry, a cake is formed under the supernatant liquor which is quite dense and hard packed; it even solidifies in time to a form resembling concrete. Although the supernatant liquor protects the cake from decomposition, the cake is obviously not a useful form of the dithionite.

When anhydrous sodium dithionite crystals are dissolved under either aerobic or anaerobic conditions to make a large quantity of aqueous solution, the resulting solution cannot be stored for use over a long period of time. Due to hydrolytic decomposition at the natural pH of the sodium dithionite solution, decomposition will proceed rapidly from that point by self-propagation because the decomposition products create an acidic condition which accelerates the decomposition.

Aqueous solutions of the dithionite will decompose at a commercially tolerable rate, however, if stabilized by additives such as are disclosed in U.S. Pat. Nos. 3,819,807 and 3,985,674. These additives include chelating agents, sodium carbonate, sodium tripolyphosphate, sodium hydroxide, and amines.

Although such stabilized solutions can be protected from decomposition for long enough periods for shipment and routine commercial use under suitable conditions, it has been more common practice to store the anhydrous dithionite crystals under a dry, inert gas in a sealed container. Even though the crystals are thereby chemically stable for long periods, they begin to decompose as soon as exposed to the air and moisture when the container is opened for use thereof.

Furthermore, commercially available solutions of sodium dithionite are expensive to transport because they are typically at concentrations of 12–13.5%, when combined with suitable additives, and additionally generally require refrigeration during shipment and storage. Thus, the transport of about seven times as much water as product tends to cause the sale of this commodity to become distance-dependent. In consequence, slurries have seemed to offer an inviting means to avoid or at least to minimize the cost of storage and difficulties associated with solution forms of sodium dithionite, without decreasing the convenience that the purchaser derives from solutions.

However, the economical preparation, stabilization, handling, and shipping of such slurries is not simple. Adequate suspension without agitation, so that pumping can be done from a tank truck after shipment, is also not easy. In fact, after considering the variety of processes that are available for manufacturing sodium dithionite, including the indigenous by-products, crystal structures, and the like, the complexities of the concept are readily appreciated. Moreover, slurries have not been as widely investigated nor as commercially utilized as other forms of sodium dithionite.

U.S. Pat. No. 3,536,445 describes a process for making sodium dithionite from sodium-zinc alloy by initially producing zinc dithionite and then converting it to sodium dithionite by adding caustic soda. After removal of the zinc hydroxide by filtration, the dihydrate of sodium dithionite is "salted out" of the mother liquor with sodium chloride and alcohol to form a slurry.

U.S. Pat. No. 3,804,944 gives some stability storage data for 30% slurries (18.5% formate-derived and 11.5% zinc-derived sodium dithionite) containing 1–8% caustic soda (dithionite basis). Tests showed that these slurries required frequent agitation to prevent caking and handling difficulties.

U.S. Pat. No. 3,839,217 shows that by reducing the particle size of the sodium dithionite crystals and/or introducing a suspending or thickening agent into a liquid containing the crystals, such as alcoholic brine, it is possible to form a fluent, homogeneous, pourable dispersion of the solid dithionite particles which is chemically and physically stable for long periods of time, provided that a material, such as the salt in the brine and/or an alcohol, be present which suppresses the dissolution of the dithionite, so that the dispersion can be stored at about 20° C. The majority of the particles should be about 0.6–0.8 micron in size. Methylcellulose, hydroxyethyl cellulose, polyvinyl alcohol, quar gum, and other common thickening, dispersing, or suspending agents can be used. The thickened dispersion exemplarily has a Brookfield viscosity of 9,000 cps and contains up to 34% $Na_2S_2O_4$.

U.S. Pat. No. 3,839,218 provides a method for maintaining a dispersion of crystalline zinc or alkali metal dithionite hydrate by continuous or periodic mechanical agitation so that the crystals can be stored for long periods without decomposition, the dispersing medium being aqueous or non-aqueous and containing a material which suppresses dissolution of the dithionite solids. The pH of the liquid must be at least 6.5, the viscosity of the dispersion must be below about 50,000 centipoises, and the suppressing material may be a water-soluble organic compound or a saturated brine or mixtures thereof. A thickening and suspending agent can be used. Suitable agents include polysaccharides, water-soluble polymers, and proteins of moderate molecular weight. Exemplary agents include guar gum, gum tragacanth, gelatin, and starch.

U.S. Pat. No. 4,283,303 discloses a method for making substantially stable slurries containing 30–35% by weight of sodium dithionite by evaporating sodium dithionite solutions while maintaining the heating medium at 220°–250° F. and the solution and slurry at 110°–155° F. under a vacuum of at least 25 inches Hg and by promptly cooling the resultant slurry while agitating it. The vacuum is preferably 26.5–27.5 inches Hg. Zinc-derived sodiation liquor is the preferred sodium dithionite solution to which 4–5% by weight of the sodium dithionite, NaOH, and a chelator, as a stabilizing agent, are added.

Although these evaporated slurries have excellent stabilization qualities, they have developed problems with settling which has occurred over a period of 2–5 days and especially under the vibrations produced by tank car shipment. Such settling and subsequent hardening has resulted in shipments which could not be unloaded by pumping as would normally be done.

Slurries are utilized as foods, coatings, paints, dyes, explosives, oilwell fluids, and the like and often include natural or synthetic gums to form a liquid colloidal system in which the solid particles are dispersed. Such a gum containing fluid system, without the solid particles, is identified as a sol and is more accurately termed a hydrosol when based on water.

The gums typically impart viscosity to sols in which they are incorporated and thereby function as thickeners. When shear forces are created by agitating a sol and there is no change in viscosity, the behavior of a thickener is said to be Newtonian. When the viscosity of the sol in a quiescent state is greater than when a shear force is applied through agitation, when the viscosity decreases as the applied shear force increases, and when the viscosity recovers immediately when the magnitude of the shear force is decreased, the behavior of a thickener is said to be plastic. When the rate of flow increases faster than normally in relation to the applied shearing stress, the sol is described as pseudoplastic. Generally, when the sol is at rest, the molecules of a plastic thickener arrange themselves into a more or less stable form. In order to break this stable molecular arrangement and cause the sol to yield, the application of a shear force is necessary. The shear force that is required to cause the sol to yield and flow is termed the yield point or the gel strength. Once the gel strength of a plastic sol is overcome, the viscosity of the sol proportionately decreases as greater shear force is applied.

Numerous natural and synthetic gums are widely used for manufacturing hydrosols. Favored gums for many hydrosols are galactomannan gums such as guar gum, which is derived from the endosperm of the guar plant, *Cyamopsis tetragonolobus*. Other water-soluble gums which are increasingly utilized are the xanthonomas hydrophilic colloids, commonly termed xanthan gums, which may be produced by the action of various bacterial species of the genus Xanthomonas on carbohydrates (and like materials). The fermentation product of the reaction of the bacteria *Xanthomonas campestris*, a preferred species, on carbohydrates is commercially available as "Kelzan XC Polymer", made by Kelco Corporation of San Diego, Calif.

In a typical process for clarification of a xanthomonas fermentation broth and/or recovery of the xanthomonas hydrocolloid component, the broth is diluted with water to reduce its viscosity, and optionally the diluted broth is centrifuged or filtered to remove suspended insoluble solids. A salt such as potassium chloride and a nonsolvent such as methanol or isopropanol are added to the broth to flocculate the gum in the potassium form, which gum is then recovered by centrifugation or other solid/liquid separation technique. Further dissolving, reprecipitating, and washing steps are usually employed. The heteropolysaccharides thus prepared by bacteria of the genus Xanthomonas on carbohydrates are normally obtained as thick viscous solutions having a dull yellow color.

Xanthan gum is an excellent and widely used suspending and viscosity building agent. Some of its particular uses are in oil well fluids, paint, sprays, and cleaning fluids. Xanthan gum, however, has a few disadvantages. It is very difficult to disperse and wet in water or brine so that hydration can take place. A high degree of shear is usually necessary in order to wet each gum particle. Once dispersal and wetting are accomplished, the hydration of the gum, as evidenced by the development of viscosity, is quite rapid. Xanthan gum and guar exhibit very different rheological characteristics, having different molecular configurations, and are obtained from entirely different sources. Various proprietary xanthan gums, having slightly different molecular structures and rheological properties by use of mutant strains of *X. Campestris*, are available from several manufacturers.

There is clearly a need for a stable dithionite hydrosol composition having such pseudoplastic properties that it is readily storable, even though subject to vibrations during tank car or tank truck shipment to a textile mill or to a pulp mill, for example, and readily pumpable when thereafter delivered to a storage tank for dilution to a solids content of 12–13% and short-term storage until needed, such as for bleaching textiles or woodpulp. However, attempts to use both guar gum and xanthan gum as suspending agents for sodium dithionite crystals have demonstrated that they have surprisingly unpredictable tendencies to form either gels or settled slurries, even during quiescent storage.

SUMMARY OF THE INVENTION

It is accordingly an object of this invention to provide a process for producing stable dithionite slurries, comprising hydrosols in which dithionite crystals can be suspended for an extended period during storage and shipment and which are readily pumpable when needed.

It is also an object to provide storable and pumpable dithionite slurries as new compositions which utilize xanthan gums as the suspending component thereof.

In general, such a suspendable, pourable, and pumpable dithionite slurry can be prepared with as little as 0.25 pound of xanthan gum per 100 pounds of slurry (0.25% xanthan content) when using the Kelzan grade as the xanthan gum. This amount is equivalent to about 146 pounds of commercial hydrosulfite per pound of xanthan. The slurry is non-settling and completely pourable at any desired solids content within the utility limits imposed by slurry viscosities. Such slurries, for example, are readily poured and pumped at viscosities of up to 8,000 cps.

However, by tolerating a slight settling, a soft and dispersible settled slurry containing as little as 0.20% xanthan gum (Kelzan grade) is obtained. Such a partially suspended but dispersible slurry is useful for many purposes, such as for shipping over relatively short distances. This quantity is equivalent to about 182 pounds of hydrosulfite per pound of the xanthan gum, exemplified by a slurry comprising 36.4% hydrosulfite and 0.20% xanthan gum.

It was further found that the addition of various ions to the slurries, such as those which are useful for prolonging the storage life of a dithionite slurry used for woodpulp, as disclosed in U.S. Pat. No. 3,985,674, enables the quantity of xanthan gum to be greatly decreased. In some proportions and for unknown reasons, the xanthan content can be decreased to as little as 0.14% of the Kelzan grade of xanthan gum with partial settling. This amount is equivalent to about 200 pounds of hydrosulfite solids per pound of xanthan gum, exemplified by a slurry comprising 28% hydrosulfite and 0.14% xanthan. However, 0.16% is preferred for most purposes, and 0.17% xanthan is highly preferred for rigorous shipping and storing conditions in such woodpulp slurries.

This result is surprising because it was discovered that the same ions have little effect on the viscosity of a xanthan hydrosol containing no hydrosulfite. However, it was noted that the same ions, in other proportions and for equally unknown reasons, can also produce unpredictable gelling of a slurry, so that a pourable and pumpable slurry containing these ions, which are needed and customarily used for woodpulp bleaching, requires at least about 0.17% xanthan of the Kelzan grade (equivalent to about 165 pounds of hydrosulfite per pound of xanthan gum).

Preferably, the slurries comprise at least about 28% of hydrosulfite, a chelate, and an alkali, so that the slurries have a pH of at least about 10. The alkali is suitably sodium hydroxide which is at least about 0.75 percent by weight of the slurry.

When the slurries are to be utilized for woodpulp bleaching, they additionally comprise at least about three percent by weight of sodium carbonate and approximately two percent by weight of sodium tripolyphosphate. For example, the chelate is the tetrasodium salt of ethylenediamine tetraacetic acid and is at least about 0.08% by weight of the slurry.

When the slurries are to be utilized for textile bleaching, they comprise, on a weight basis, at least about 36% of commercial sodium dithionite, at least about 3% of sodium hydroxide as the alkali, at least about 0.25% of mixed chelates, and at least about 0.25% of xanthan gum (Kelzan grade). The viscosity is within the range of 6,000–8,000 cps.

Using solid xanthan gum produced by the common strain of *X. Campestris* (i.e., the Kelzan grade), the preferred contents of slurries for woodpulp bleaching, on a weight basis, are about 28% of commercial sodium dithionite, 0.17% xanthan, 1.9% sodium tripolyphosphate, 3.3% sodium carbonate, and 0.08% of the sodium salt of ethylenediamine tetraacetic acid. The viscosity is within the range of 3,000–4,000 cps. However, when using other forms of xanthan gum, such as mutant gums, the amount of xanthan gum can be considerably reduced without settling or gellation difficulties. For example, the K9C57 grade of xanthan gum, which is also produced by Kelco, produces a pourable and pumpable slurry with merely 0.13% xanthan gum, equivalent to about 230 pounds of suspended hydrosulfite per pound of xanthan.

The method for making a storable and pumpable dithionite slurry from commercial sodium hydrosulfite comprises, on a weight basis:

A. preparing a hydrosol as a 1% aqueous solution of xanthan gum;
B. adding an appropriate amount of this xanthan solution, to provide about 0.13–0.25% by weight of xanthan gum, to water while stirring;
C. sequentially adding aqueous solutions of a chelate and 50% NaOH solution, while stirring the 0.13–0.25% solution;
D. cooling the resulting solution to a temperature slightly above 32° F. (0° C.) in an ice bath; and
E. adding anhydrous sodium hydrosulfite to the cold solution at such a rate as to maintain its temperature below 45° F. (7° C.) and in sufficient amount to provide a slurry containing 28–36% $Na_2S_2O_4$ (commercial grade) and a pH of at least 10.

If the slurry is to be used for bleaching woodpulps, aqueous solutions of sodium carbonate and sodium tripolyphosphate are additionally added to the xanthan solution or to the aqueous dithionite slurry, and more sodium hydroxide is also added to provide a pH of at least 13.

The slurry can alternatively be prepared by adding the xanthan solution of Step A to a cooled aqueous dithionite slurry containing the chelate and alkali, as the last step of the procedure. The chelate and other additives can also be added to the xanthan solution for admixing with the dithionite slurry. In addition, the dithionite can be the product of any known process, such as zinc-derived, formate-derived, borohydride-derived, and electrolytically derived sodium dithionite. Furthermore, the procedure for preparing the sodium dithionite slurry can include flash evaporation or vacuum evaporation (such as with a wiped film evaporator) to create sodium dithionite crystals and addition of crystalline sodium dithionite from one process to an available sodium dithionite solution from another process and then adding the xanthan, preferably as a solution or hydrosol, and the other necessary additives, such as a chelate and selected alkaline agents.

EXAMPLES

Experimental work to produce a storable and then pumpable dithionite slurry utilized a formate-derived sodium dithionite (F/hydrosulfite), having an average content of 88% to 89% of pure $Na_2S_2O_4$. In many experiments, the F/hydrosulfite was used as a component of two types of commercially distributed bleaching preparations: (1) a textile bleaching system and (2) a wood pulp bleaching system, both being proprietary blends. These slurries are stable for at least three weeks during storage at 32°–40° F. The physical properties of the slurries are as follows:

|  | Textile Slurry | Woodpulp Slurry |
| --- | --- | --- |
| Density | 1.4 g/ml | 1.4 g/ml |
| pH | 13 | 10–11 |
| Appearance | White | White |
| Viscosity* | 6000–8000 cps | 3000–4000 cps |

| | Textile Slurry | Woodpulp Slurry |
|---|---|---|
| Freezing Point | 17–18° F. | 16–17° F. |

*Saybolt Viscosimeter

The lab stirrer used in these experiments was a Model HS of the Jiffy Mixer Company Inc., Irvine, Calif.

A widely available polysaccharide, produced in a culture fermentation by the microorganism *Xanthomonas Campestris* and sold by Kelco, a division of Merck and Company, Inc., under the trademark Kelzan as an industrial-grade xantham gum, is a dry, cream-colored powder having a moisture content of 12%, an ash content of 10%, a specific gravity of 1.6, a bulk density of 52.4 pounds per cubic foot, a nitrogen content of 1.2%, and a mesh size of 40. As a 1% solution in distilled water, its pH is 7.0, its surface tension is 75 dynes/cm, its viscosity is 850 cps as measured with a Brookfield LVF viscosimeter at 60 rpm, and its freezing point is 0.0° C.

Another solid xanthan gum which is produced by Kelco under the trademark K9C57 has rheological properties of high viscosity at low concentration, pseudoplastic flow over a wide shear rate range, and a significant yield point. Such properties indicate that the xanthan gum molecules have a rigid molecular structure. At a very low shear rate (below one reciprocal second), this mutant xanthan gum exhibits more Newtonian flow than the Kelzan gum. Sold as a dry powder, its solids content is 85–92%. As a 1% solution in distilled water, its pH range is 6–8 and its viscosity is 630–1000 cp.

A whole xanthan broth, having a viscosity in the range of 3500–4500 cps, which is readily pumped or poured and has an observable yield point at biopolymer concentrations above 0.1%, is available as FLOCON Biopolymer 4800 from the Pfizer Chemical Company at biopolymer concentrations of 13.8% or 3.7%. The aqueous broth is believed to be made from a mutant strain of *Xanthomonas campestris*. It is preserved with formaldehyde and never exceeds 1.5% concentration of unreacted sugar. It is a tan gelatinous fluid in appearance. It has an apparent content of active purified carbohydrate that is higher than commercial solid xanthan.

Solutions of FLOCON 4800 are highly pseudoplastic in nature so that the viscosity, which decreases upon exposure to high shear, is fully restored when solutions return to low-shear conditions. Solution viscosities of this biopolymer are not affected by pH in the range of 5–12.

EXAMPLES 1–13

Attempts to prepare dithionite slurries which would neither settle or gel, thereby creating unpumpable shipments, began by adding eight materials having either thickening or charge repulsion characteristics to the dithionite slurries containing 35% F/hydrosulfite. All of these slurries were determined by observation to be unsatisfactory, as noted in Table I.

TABLE I

Attempts to Prepare F/Hydrosulfite Slurry (35% Solids)

| Ex | Additive | Type | Wt. % | Comments (after mixing-no storage) |
|---|---|---|---|---|
| 1 | Sanogel | thickening | 0.5% | Non-uniform |
| 2 | Sanogel | thickening | 0.3 | Non-uniform |
| 3 | Sodium Alginate | thickening | 0.5 | Some settling |
| 4 | Sodium Alginate | thickening | 0.3 | Free liquid at top |
| 5 | Gelatin | thickening | 0.5 | No settling, vol. increase |
| 6 | Gelatin | thickening | 0.3 | Vol. increase, no settling |
| 7 | Carbomethoxy cellulose | thickening | 0.3 | Settled |
| 8 | Blancol-N | charge repulsion | 0.3 | Much settling |
| 9 | Starch | thickening | 0.25 | Some settling |
| 10 | Starch | thickening | 0.1 | Some settling |
| 11 | Natrosol | thickening | 0.3 | Some settling |
| 12 | Natrosol | thickening | 0.1 | Some settling |
| 13 | Nekal BX78 | charge repulsion | 0.3 | Significant free liquid (>12.5%) |

Natrosol — hydroxyethyl cellulose (Hercules Co.)
Nekal BX78 — a sodium alkyl naphthalene sulfonate (GAF)
Blancol-N — sodium naphthalene sulfonate (GAF)
Sanogel — a methyl cellulose (Hercules Co.)

EXAMPLES 14–23

Experiments were then conducted with guar gum as a suspending agent for two types of F/hydrosulfite slurries that are marketed as bleaching systems. Examples 14–19 utilized the textile bleaching type and are given in Table II. Examples 20–23 utilized the woodpulp bleaching type and are given in Table III. In both tables, "% F/hydro" indicates the weight percentage of formate-derived sodium hydrosulfite that was used in the slurry. As noted in these two tables, none of the guar-thickened slurries was satisfactory, as was readily determinable by observation.

EXAMPLES 24–28

A 1% solution of Kelzan xanthan gum in water was first prepared for Examples 24–26. An appropriate weighed amount of this solution was added to predetermined amounts of water, then an alkali and a chelate were added. The alkali was in the form of 50% NaOH. The chelate was either the sodium salt of ethylenediamine tetraacetic acid (EDTA) or Hampene-OH, a liquid mixture of chelating agents sold by the Organic Chemicals Division of W. R. Grace and Company, Nashua, N.H.

The solution was cooled to 32° F., and the solid F/hydrosulfite was added at such a rate as to maintain the temperature at 40°–45° F. The slurry was then returned to the cooling bath and checked in three days for its pourability, etc.

The use of Kelzan as the xanthan gum is shown at three levels in a textile bleaching slurry in Table IV.

TABLE II

Slurries With Guar Gum (Textile Type)

| Ex | % H$_2$O | % Guar | % NaOH (50%) | % Chelate | % F/hydro | F/hydro guar | Comments |
|---|---|---|---|---|---|---|---|
| 14 | 57.3 | 0.05 | 6.1 | 0.25 | 34.8 | 698 | Settled; would not flow |
| 15 | 57.8 | 0.1 | 6.1 | 0.25 | 34.8 | 340 | Settled; would not flow |
| 16 | 49.4 | 0.05 | 7.4 | 0.25 | 42.2 | 844 | Set up solid |
| 17 | 49 | 0.1 | 7.4 | 0.25 | 42.3 | 422 | Set up solid |
| 18 | 53.7 | 0.07 | 6.7 | 0.25 | 38.5 | 550 | Settled; ½" free liquid at top |
| 19 | 56.6 | 0.25 | 6.4 | 3.0 | 36.4 | 146 | Set up solid |

TABLE III

Slurries With Guar Gum (Woodpulp Type)

| Ex | % H$_2$O | % Guar | % Na$_2$CO$_3$ | % Na$_5$P$_3$O$_{10}$ | % NaOH | % F/hydro | F/hydro guar | Comments |
|---|---|---|---|---|---|---|---|---|
| 20 | 68.0 | 0.1 | 1.9 | 1.9 | 1.98 | 25 | 250 | Set up (Opalescent crystals) |
| 21 | 65.77 | 0.17 | 3.28 | 1.92 | 0.78 | 28.0 | 165 | Separated |
| 22 | 67 | 0.2 | 1.9 | 1.9 | 1.98 | 25 | 125 | Set up |
| 23 | 66 | 0.3 | 1.9 | 1.9 | 1.98 | 25 | 83 | Settled |

TABLE IV

Effect of Xanthan Level on Textile Bleaching Slurry (Weight Basis)

| Ex. No. | Water Parts | Water Percent | Xanthan Parts | Xanthan Percent | 50% NaOH Parts | 50% NaOH Percent | Hampene-OH Parts | Hampene-OH Percent | F/hydro Parts | F/hydro Percent | State of Slurry |
|---|---|---|---|---|---|---|---|---|---|---|---|
| 24 | 350 | 56.6 | 275 | 0.25 | 71 | 6.4 | 3.0 | 0.27 | 401 | 36.4 | flowed completely |
| 25 | 375 | 56.6 | 250 | 0.23 | 71 | 6.4 | 3.0 | 0.27 | 401 | 36.4 | ⅛ inch free liquor; flowed |
| 26 | 400 | 56.6 | 225 | 0.20 | 71 | 6.4 | 3.0 | 0.27 | 401 | 36.4 | ¼ inch free liquor; flowed |
| 27 | — | 59.8 | — | 0.25 | — | 6.46 | — | 0.27 | — | 36.45 | flowed completely |
| 28 | — | 59.8 | — | 0.25 | — | 6.46 | — | 0.27 | — | 36.45 | flowed completely |

The parts by weight of the 1% xanthan solution are given as parts by weight of xanthan gum for each example. Although the complete flowing of Example 24 is preferred, the slight settling and flowing of Examples 25 and 26 is suitable for some usages, particularly for shipment situations involving relatively mild vibrations or short times of transit.

Examples 27 and 28 were prepared by dissolving the xanthan gum (Kelzan grade) in 12% of the total amount of water that was used to form a hydrosol. The NaOH solution and the chelate were then added, and the admixed solution was chilled to about 35° C. To the remainder of the water, the crystalline F/hydrosulfite (88% Na$_2$S$_2$O$_4$) was added with cooling to maintain a temperature of 45° C. To this aqueous slurry, the hydrosol was added to produce a stable slurry that did not settle within three days. After two days of storage at about 35° C., the slurry of Example 27 had a viscosity of 7,120 cps; the slurry of Example 28 had a viscosity of 7,980 cps.

EXAMPLES 29-45

Experiments to produce a storable but pumpable slurry, using the woodpulp bleaching system, comprised first making a 1% aqueous solution of Kelzan gum and then adding an appropriate amount of this solution to water for Examples 29-37. The next additions to the water were solutions of sodium carbonate, sodium tripolyphosphate, chelate, and then 50% NaOH solution. The entire solution was then cooled to 32° F. in an ice bath. The required amount of solid (crystalline) F/hydrosulfite was added at such a rate as to maintain the temperature below 45° F. The slurry was then again cooled in the ice bath for three days and observed for separation, settling, and pourability.

Examples 44 and 45 were prepared similarly to Examples 27 and 28 by dissolving the xanthan gum in 12% of the total water to form a hydrosol and then adding the Na$_2$CO$_3$, the Na$_5$P$_3$O$_{10}$, the NaOH solution, and the chelate. Then the solution was chilled to about 35° C. The solid, crystalline F/hydrosulfite was added with cooling to maintain a temperature of 45° C. To this aqueous slurry, the xanthan hydrosol was added to produce stable slurries which had not settled after three days of storage. The slurry of Example 44 had a density of 1.37 g/ml and a viscosity of 3,900 cps. The slurry of Example 45 has a viscosity of 4,040 cps.

The following examples in Table V illustrate the criticality of the xanthan concentration, all observations being made after three days in a wet ice bath and all percentages being given on a weight basis, without correcting for the impurity in the F/hydrosulfite. Correcting for the impurity in the F/hydrosulte by multiplying by 0.885 as an average value, the amount of pure Na$_2$S$_2$O$_4$ in the F/hydrosulfite of the examples is as follows:

| F/hydro, % | Pure Na$_2$S$_2$O$_4$, % |
|---|---|
| 27 | 23.9 |
| 28 | 24.8 |
| 30 | 26.6 |
| 31 | 27.4 |
| 36.4 | 32.2 |

TABLE V

Woodpulp Slurries Having Critical Xanthan Levels (Weight Basis)

| Ex. No. | % Water | % Xanthan | % Na$_5$P$_3$O$_{10}$ | % Na$_2$CO$_3$ | % NaOH | % Chelate** | % F/hydro | Ratio* | Observations |
|---|---|---|---|---|---|---|---|---|---|
| 29 | 65.77 | 0.17 | 1.92 | 3.28 | 0.78 | 0.08 | 28.0 | 3.92 | poured |
| 30 | 65.79 | 0.15 | 1.92 | 3.28 | 0.78 | 0.08 | 28.0 | 3.92 | settled |
| 31 | 63.35 | 0.16 | 2.06 | 3.52 | 0.83 | 0.08 | 30.0 | 3.91 | set-up, would not pour |
| 32 | 66.29 | 0.17 | 1.57 | 2.96 | 0.89 | 0.12 | 28.0 | 4.02 | poured |
| 33 | 66.32 | 0.14 | 1.57 | 2.96 | 0.89 | 0.12 | 28.0 | 4.02 | settling noted |
| 34 | 62.72 | 0.15 | 1.73 | 3.27 | 0.99 | 0.14 | 31.0 | 4.41 | set-up, would not pour |
| 35 | 66.2 | 0.13 | 2.39 | 2.15 | 1.11 | — | 28.0 | 5.29 | set-up |
| 36 | 66.2 | 0.13 | 0.24 | 4.30 | 1.11 | — | 28.0 | 3.44 | set-up |
| 37 | 66.2 | 0.14 | 2.31 | 2.07 | 1.07 | — | 27.0 | 5.29 | settling noted |
| 38 | 63.60 | 0.13 | 2.22 | 4.89 | 0.95 | 0.21 | 28.0 | 2.71 | set-up |
| 39 | 63.58 | 0.15 | 2.22 | 4.89 | 0.95 | 0.21 | 28.0 | 2.71 | set-up |
| 40 | 63.56 | 0.17 | 2.22 | 4.89 | 0.95 | 0.21 | 28.0 | 2.71 | set-up |
| 41 | 63.54 | 0.19 | 2.22 | 4.89 | 0.95 | 0.21 | 28.0 | 2.71 | set-up |
| 42 | 63.52 | 0.21 | 2.22 | 4.89 | 0.95 | 0.21 | 28.0 | 2.71 | set-up |
| 43 | 63.50 | 0.23 | 2.22 | 4.89 | 0.95 | 0.21 | 28.0 | 2.71 | set-up |
| 44 | 65.76 | 0.17 | 1.92 | 3.29 | 0.78 | 0.08 | 28.0 | 3.92 | flowed completely |
| 45 | 65.76 | 0.17 | 1.92 | 3.29 | 0.78 | 0.08 | 28.0 | 3.92 | flowed completely |

*Ratio = $\dfrac{\text{Mols 100\% Na}_2\text{S}_2\text{O}_4}{\text{Mols Na}_5\text{P}_3\text{O}_{10} + \text{Mols Na}_2\text{CO}_3}$

**Examples 29-34, 44, 45 - EDTA—Na$_4$
**Examples 38-43 - Hampene OH-1

EXAMPLES 46-52

The following four examples in Tables VI and VII illustrate the use of Pfizer's FLOCON Biopolymer 4800 as a 13.8% FLOCON broth in Example 46 and a 3.7% FLOCON broth in Example 47 for a textile slurry. Examples 48 and 49 respectively illustrate the use of a 3.7% and a 13.8% FLOCON broth at 0.19% Xanthan with a woodpulp slurry, both having been made with F/hydrosulfite.

Experiments with K9C57 xanthan gum are given as Examples 50-52 in Table VIII to illustrate the use of this xanthan in woodpulp slurries that would ordinarily set up or be in some way unstable with Kelzan gum. The ratio in the next-to-last column is obtained by dividing the total mols of sodium tripolyphosphate (expressed as Na$_5$P$_3$O$_{10}$) plus mols Na$_2$CO$_3$ into the mols of 100% Na$_2$S$_2$O$_4$. Ideally, this ratio should be around 4.0±0.2 for the use of Kelzan. Excursions above and below this ratio require the use of K9C57 or the FLOCON Biopolymer.

On a weight basis, it appears that the biopolymer broth is approximately equivalent to the solid xanthan which is sold under the trademark K9C57 in its ability to produce a hydrosulfite slurry of acceptable storage and pumping capability.

The flow properties exhibited in Examples 50-52 are indeed remarkable as compared to Examples 38-43. The reasons for settling in some experiments and for gelling in others were inexplicable.

TABLE VI

Flocon Biopolymer 4800 Broth as Xanthan Source for Textile Bleaching Slurries

| Ex No | % H$_2$O | % Xanthan | % 50% NaOH | % Hampene-OH | % VIRTEX-D | Appearance |
|---|---|---|---|---|---|---|
| 46 | 55.0 | 0.25(a) | 6.45 | 0.27 | 36.5 | flowed completely |
| 47 | 55.0 | 0.25(b) | 6.45 | 0.27 | 36.5 | flowed completely |

(a) as a 13.8% Flocon Broth
(b) as a 3.7% Flocon Broth

TABLE VII

Flocon Biopolymer 4800 Broth as Xanthan Source for Woodpulp Bleaching Slurries

| Ex No. | % H$_2$O | % Xanthan | % NaOH | % Na$_2$CO$_3$ | % Na$_5$P$_3$O$_{10}$ | % F/hydro | Ratio | Appearance |
|---|---|---|---|---|---|---|---|---|
| 48 | 61.2 | 0.19(b) | 1.11 | 2.39 | 2.15 | 28.0 | 4.99 | flowed completely |
| 49 | 64.9 | 0.19(a) | 1.11 | 2.39 | 2.15 | 28.0 | 4.99 | flowed completely |

(a) as a 13.8% Flocon Broth
(b) as a 3.7% Flocon Broth

TABLE VIII

K9C57 Xanthan in Woodpulp Bleaching Slurries

| Ex No. | % H$_2$O | % Xanthan | % Na$_2$CO$_3$ | % Na$_5$P$_3$O$_{10}$ | % NaOH | % F/hydro | Ratio | Comments |
|---|---|---|---|---|---|---|---|---|
| 50 | 66.2 | 0.13 | 2.1 | 2.3 | 1.1 | 28.0 | 5.43 | flowed completely |
| 51 | 66.2 | 0.19 | 2.1 | 2.3 | 1.1 | 28.0 | 5.43 | flowed completely |
| 52 | 63.8 | 0.13 | 2.3 | 2.5 | 1.2 | 30.0 | 5.32 | flowed completely |

Although Kelco literature asserts that xanthan gum solutions made with Kelzan have unusually good compatibility and stability in the presence of many salts, it admits that an incompatibility does exist between xanthan gum and polyvalent metal ions at high pH which can often be controlled or prevented by the addition of sequestrants such as polyphosphates. The gelling of Examples 31, 33, 34, 35, and 36 indicates that a crosslinking occurred that was not alleviated by increasing the $Na_2CO_3$ content (Examples 31 and 36) or by decreasing the $Na_5P_3O_{10}$ content (Example 36). Moreover, the low level of xanthan K9C57 in Examples 50 and 52 (0.13%) can be compared directly to Examples 35 and 36.

EXAMPLES 53-74

An investigation of viscosities of hydrosols prepared with both the Kelzan and the K9C57 xanthan gums for use in the proprietary woodpulp bleaching blend, without the F/hydrosulfite and including five levels of $Na_5P_3O_{10}$ (STPP) alone and in combination with $Na_2CO_3$, revealed a hitherto unsuspected synergistic effect upon viscosity between STPP and $Na_2CO_3$, as recorded in Tables IX and X.

In Examples 53-58 the viscosities of solutions containing Kelzan gum at 0.19% by weight and STPP at five levels are compared after one and four days storage. In Examples 59-64, the viscosities of solutions containing K9C57 gum at 0.19% by weight and STPP at five levels are also compared after one and four days storage and show a surprising decrease in viscosity at all levels of STPP.

TABLE IX

| Viscosities of Xanthan Gum - $Na_5P_3O_{10}$ Solutions | | | | | | | |
|---|---|---|---|---|---|---|---|
| Ex No | % $H_2O$ | % Xanthan | Type Xanthan | % $Na_5P_3O_{10}$ | Days Stored | Viscosity CPS | Days Stored | Viscosity CPS |
| 53 | 99.81 | .19 | Kelzan | — | 1 | 238 | 4 | 238 |
| 54 | 99.31 | .19 | Kelzan | .50 | 1 | 196 | 4 | 196 |
| 55 | 98.81 | .19 | Kelzan | 1.00 | 1 | 200 | 4 | 200 |
| 56 | 98.31 | .19 | Kelzan | 1.50 | 1 | 208 | 4 | 208 |
| 57 | 97.81 | .19 | Kelzan | 2.00 | 1 | 220 | 4 | 220 |
| 58 | 97.31 | .19 | Kelzan | 2.50 | 1 | 226 | 4 | 226 |
| 59 | 99.81 | .19 | K9C57* | — | 1 | 98 | 4 | 100 |
| 60 | 99.31 | .19 | K9C57* | .50 | 1 | 90 | 4 | 92 |
| 61 | 98.81 | .19 | K9C57* | 1.00 | 1 | 86 | 4 | 90 |
| 62 | 98.31 | .19 | K9C57* | 1.50 | 1 | 90 | 4 | 90 |
| 63 | 97.81 | .19 | K9C57* | 2.00 | 1 | 90 | 4 | 90 |
| 64 | 97.31 | .19 | K9C57* | 2.50 | 1 | 90 | 4 | 90 |

*Developmental xanthan manufactured by Kelco.

TABLE X

| Viscosities of Xanthan Gum - $Na_5P_3O_{10}$ Solutions | | | | | | | | | | |
|---|---|---|---|---|---|---|---|---|---|---|
| Ex No | % $H_2O$ | % Xanthan | Type Xanthan | % $Na_5P_3O_{10}$ | % $Na_2CO_3$ | % NaOH | Days Stored | Viscosity CPS | Days Stored | Viscosity CPS | Days Stored | Viscosity CPS |
| 65 | 98.25 | .19 | Kelzan | .50 | .84 | .22 | 1 | 176 | 3 | 180 | 6 | 182 |
| 66 | 96.70 | .19 | Kelzan | 1.00 | 1.67 | .44 | 1 | 206 | 3 | 210 | 6 | 210 |
| 67 | 95.14 | .19 | Kelzan | 1.50 | 2.51 | .66 | 1 | 270 | 3 | 274 | 6 | 264 |
| 68 | 93.58 | .19 | Kelzan | 2.00 | 3.35 | .88 | 1 | 330 | 3 | 354 | 6 | 296 |
| 69 | 92.02 | .19 | Kelzan | 2.50 | 4.19 | 1.10 | 1 | 512 | 3 | 448 | 6 | 402 |
| 70 | 98.25 | .19 | K9C57* | .50 | .84 | .22 | 1 | 70 | 3 | 74 | 6 | 72 |
| 71 | 96.70 | .19 | K9C57* | 1.00 | 1.67 | .44 | 1 | 68 | 3 | 70 | 6 | 70 |
| 72 | 95.14 | .19 | K9C57* | 1.50 | 2.51 | .66 | 1 | 76 | 3 | 80 | 6 | 80 |
| 73 | 93.58 | .19 | K9C57* | 2.00 | 3.35 | .88 | 1 | 84 | 3 | 86 | 6 | 86 |
| 74 | 92.02 | .19 | K9C57* | 2.50 | 4.19 | 1.10 | 1 | 86 | 3 | 88 | 6 | 88 |

*Developmental xanthan manufactured by Kelco.

Similar comparisons in the presence of $Na_2CO_3$ at five levels by weight are available in Examples 65-74. The reduction in viscosity is even greater than in the comparative Examples 59-64. It would be expected that this lower viscosity would necessitate larger quantities of K9C57 xanthan to suspend the same amount of F/hydrosulfite as in the slurry using the Kelzan type of xanthan gum. However, a comparison of Examples 50 and 52 with Examples 33, 35, and 36 shows exactly the opposite effect.

What is claimed is:

1. A storable and pumpable tripolyphosphate-free aqueous slurry which consists essentially of at least about 25% pure sodium dithionite by weight, at least about 0.20% Xanthan gum, by weight, a chelate, an alkali, and water, said slurry having a pH of at least 10.

2. A method for making a storable and pumpable aqueous dithionite slurry from crystalline dithionite which comprises, on a weight basis:
   (A) preparing a dilute hydrosol containing about 0.13-0.25% by weight of Xanthan gum;
   (B) sequentially adding aqueous solutions of a chelate and sodium hydroxide or potassium hydroxide to the dilute hydrosol, while stirring said dilute hydrosol to form an alkaline hydrosol;
   (C) cooling said alkaline hydrosol to 32° F. (0°) in an ice bath to form a cold hydrosol;
   (D) adding sodium dithionite to said cold hydrosol at such a rate as to maintain its temperature below 7° C. and in sufficient amount to provide said dithionite slurry containing at least about 25% of pure sodium dithionite and having a pH of at least 10; and
   (E) recovering a storable and pumpable tripolyphosphate-free aqueous sodium dithionite slurry.

* * * * *